United States Patent
Park et al.

(10) Patent No.: US 10,587,903 B2
(45) Date of Patent: Mar. 10, 2020

(54) DISPLAY APPARATUS AND METHOD OF DISPLAYING CONTENT

(71) Applicant: SAMSUNG ELECTRONICS CO., LTD., Suwon-si (KR)

(72) Inventors: Han-jin Park, Suwon-si (KR); Su-min Kim, Yongin-si (KR); Seock-young Shim, Seoul (KR); Ji-eun Lee, Suwon-si (KR); Sung-min Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/813,837

(22) Filed: Nov. 15, 2017

(65) Prior Publication Data

US 2018/0146224 A1 May 24, 2018

Related U.S. Application Data

(60) Provisional application No. 62/424,627, filed on Nov. 21, 2016.

(30) Foreign Application Priority Data

Mar. 10, 2017 (KR) .......................... 10-2017-0030535

(51) Int. Cl.
*H04N 21/41* (2011.01)
*H04N 21/2343* (2011.01)
*H04N 21/422* (2011.01)
*H04N 21/431* (2011.01)
*H04N 21/81* (2011.01)
(Continued)

(52) U.S. Cl.
CPC ...... *H04N 21/23439* (2013.01); *G06F 1/1622* (2013.01); *H04L 43/0811* (2013.01); *H04N 21/4126* (2013.01); *H04N 21/4131* (2013.01); *H04N 21/422* (2013.01); *H04N 21/4312* (2013.01); *H04N 21/4316* (2013.01);
(Continued)

(58) Field of Classification Search
CPC .................................................. H04N 21/4162
See application file for complete search history.

(56) References Cited

U.S. PATENT DOCUMENTS 5,134,390 A 7/1992 Kishimoto et al.
5,495,295 A 2/1996 Long
(Continued)

FOREIGN PATENT DOCUMENTS

EP 2 091 242 A1 8/2009
EP 2 986 013 A1 2/2016

OTHER PUBLICATIONS

Communication dated Jan. 24, 2018 by the European Patent Office in counterpart European Patent Application No. 17200289.1.

*Primary Examiner* — Michael H Hong
(74) *Attorney, Agent, or Firm* — Sughrue Mion, PLLC

(57) ABSTRACT

Provided are a rotatable display device and a method of displaying content using the same. The display device includes a display; and a controller configured to control the display to display first video content based on a first source, sense pivoting of the display while the first video content is displayed, and control the display, in response to the pivoting, to display second video content based on at least one second source different from the first source, the second video content being different from the first video content.

18 Claims, 17 Drawing Sheets

(51) Int. Cl.
*G06F 1/16* (2006.01)
*H04L 12/26* (2006.01)
*H04N 21/462* (2011.01)
*H04N 5/50* (2006.01)
*H04N 7/088* (2006.01)

(52) U.S. Cl.
CPC ..... *H04N 21/4622* (2013.01); *H04N 21/8133* (2013.01); *H04N 5/50* (2013.01); *H04N 7/0887* (2013.01)

(56) References Cited

U.S. PATENT DOCUMENTS

| | | | |
|---|---|---|---|
| 7,096,489 B2 | 8/2006 | Kitsukawa et al. | |
| 8,196,159 B2 * | 6/2012 | Jeong | H04H 60/16 |
| | | | 455/3.06 |
| 9,244,530 B1 * | 1/2016 | Raman | G06F 3/0487 |
| 9,785,398 B2 * | 10/2017 | Wheatley | H04N 21/472 |
| 9,817,549 B2 * | 11/2017 | Chandrasekaran | G06F 3/0482 |
| 9,947,191 B2 * | 4/2018 | Wada | G08B 13/196 |
| 2016/0252930 A1 * | 9/2016 | Senatori | G06F 1/1616 |
| | | | 361/679.27 |

* cited by examiner

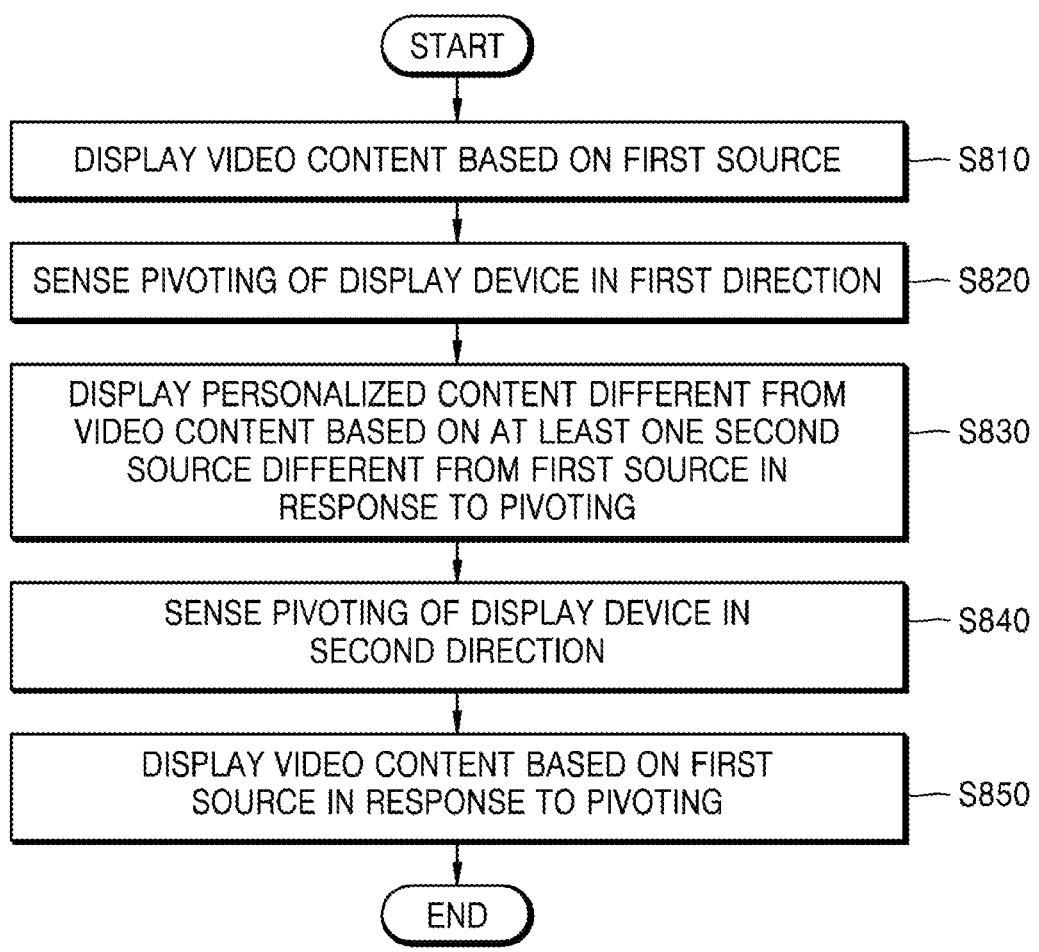

FIG. 14
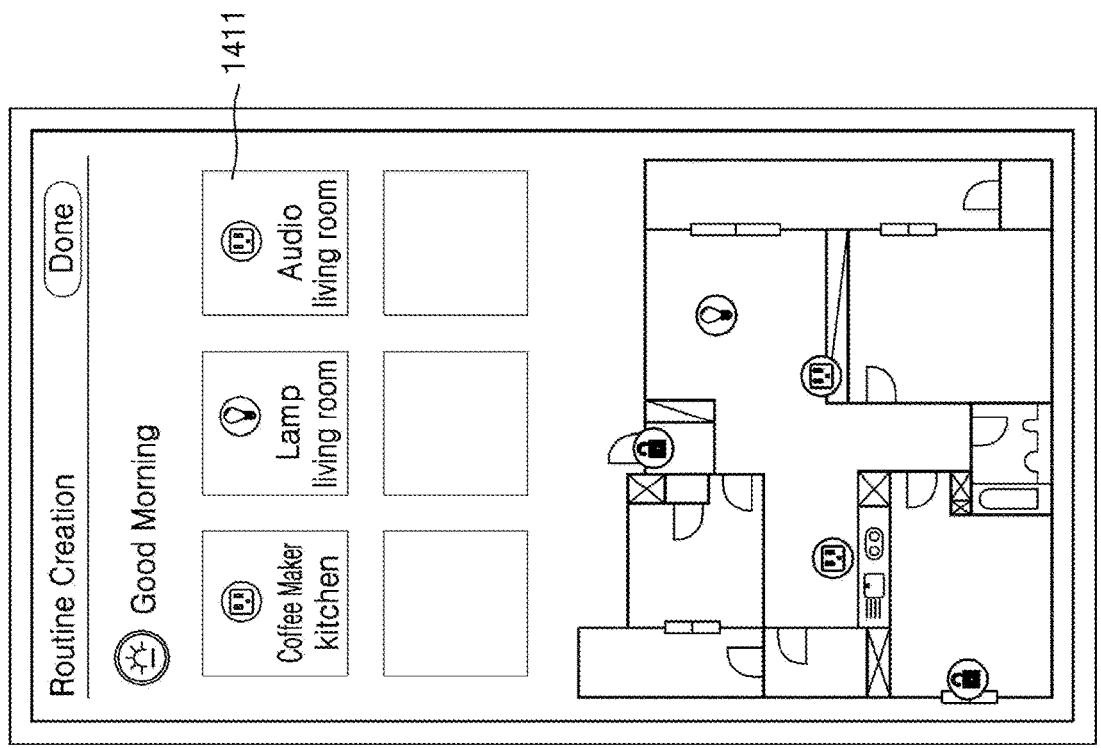
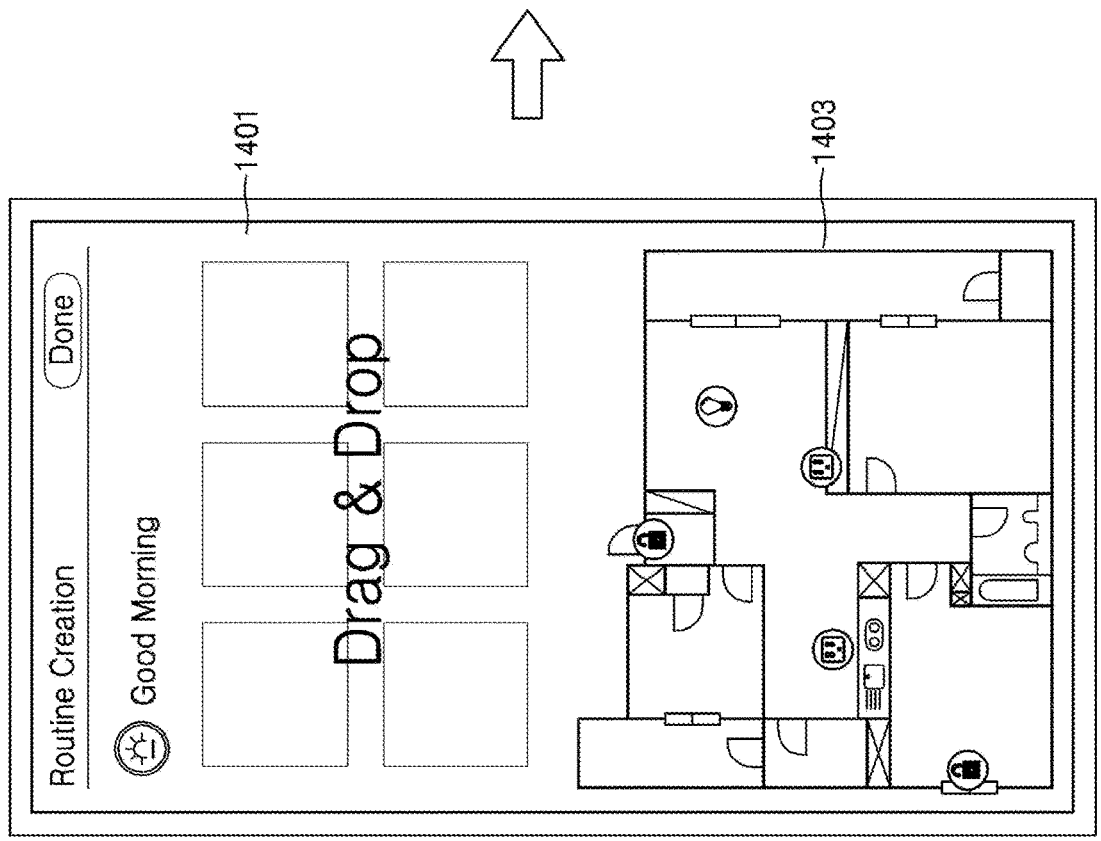

DISPLAY APPARATUS AND METHOD OF DISPLAYING CONTENT

CROSS-REFERENCE TO RELATED APPLICATIONS

This application claims priority from U.S. Provisional Application No. 62/424,627, filed on Nov. 21, 2016 in the U.S. Patent and Trademark Office, and Korean Patent Application No. 10-2017-0030535, filed on Mar. 10, 2017 in the Korean Intellectual Property Office, the disclosures of which are incorporated herein in their entireties by reference.

BACKGROUND

1. Field

Apparatuses and methods consistent with the present disclosure relate to a display device and a method of displaying content, and more particularly, to a display device for displaying content different from existing content when the display device rotates and a method of displaying content.

2. Description of the Related Art

A display device is a device having a function of displaying an image that a user can watch. Broadcast television has been phasing out analog broadcasting in favor of digital broadcasting worldwide.

Recently, smart TV service providers are developing various services to provide content desired by users. In addition, the smart TV service providers are developing technologies for providing consumers with personalized content along with video content in order to provide various services and differentiated experiences to users.

A related art display device is configured to have a landscape orientation, which is suitable for displaying landscape-oriented content, but is unsuitable for displaying portrait-oriented content. In addition, the related art display device is mainly for playing content that multiple people can view together, and it is difficult to provide optimized content to users individually.

SUMMARY

One or more example embodiments provide a rotatable display device that is optimized to play portrait-oriented content and a method of displaying content.

One or more example embodiments also provide a rotatable display device that provides optimized content to each user when the display device is rotated to have a portrait orientation and a method of displaying content.

Additional aspects will be set forth in part in the description which follows and, in part, will be apparent from the description, or may be learned by practice of the presented example embodiments.

According to an aspect of an example embodiment, a display device includes a display; and a controller configured to control the display to display first video content based on a first source, sense pivoting of the display while the first video content is displayed, and control the display, in response to the pivoting, to display second video content based on at least one second source different from the first source, the second video content being different from the first video content.

The second video content may include personalized content for a user of the display device.

The at least one second source may include a source selected by a user of the display device.

The controller may obtain first information related to the second video content, and the personalized content may include second information related to the first video content.

The controller may be further configured to control the display to display the first video content on a first portion of a screen of the display, and display the personalized content on a second portion of the screen of the display.

The first source may include a broadcast signal, and the at least one second source may include a wired or wireless communication signal of the display device.

The personalized content may include at least one of a preloaded channel list and a menu list related to the first video content.

The second source may include a signal from a mobile device, and the personalized content may be identical to third video content being displayed on a screen of the mobile device.

The personalized content may include a still image stored in the display device or a mobile device.

The personalized content may include a user interface for controlling a peripheral device capable of communicating with the display device.

According to an aspect of another example embodiment, there is provided a method of displaying content on a display device, the method including displaying first video content based on a first source; sensing pivoting of the display while the first video content is displayed; and, in response to the sensing the pivoting, displaying second video content based on at least one second source different from the first source, the second video content being different from the first video content.

BRIEF DESCRIPTION OF THE DRAWINGS

The above and/or other aspects will become apparent and more readily appreciated from the following description of example embodiments, taken in conjunction with the accompanying drawings in which:

FIG. 8 is a flowchart of a method of displaying content in a display device, according to an example embodiment;

FIG. 14 is a view of a screen displayed on a display device in a portrait mode, according to an example embodiment.

DETAILED DESCRIPTION

Figure 1:
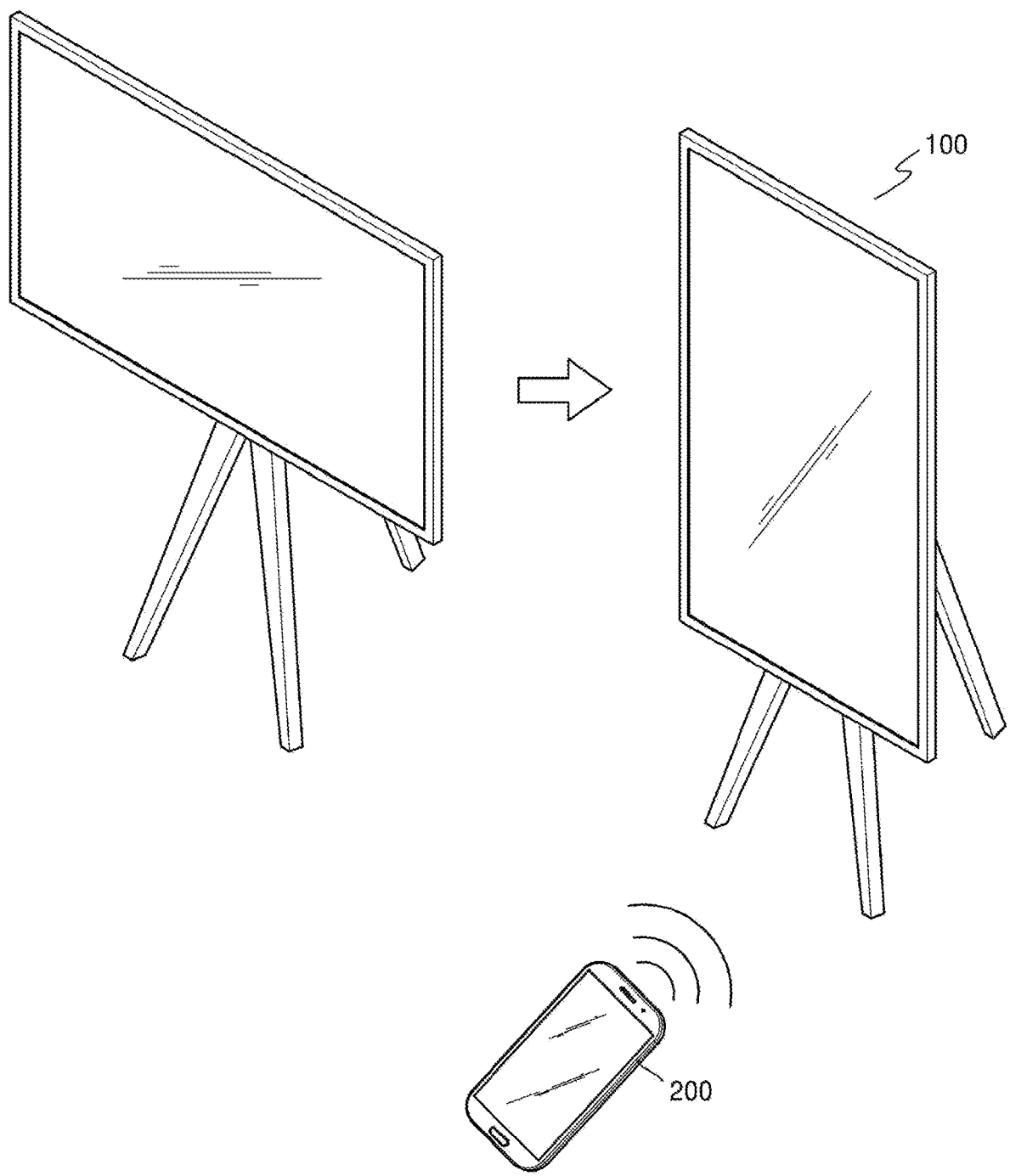
FIG. 1 is a view of a display device and a control device according to an example embodiment.

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects.

It will be understood that, although the terms "first," "second," etc. may be used herein to describe various elements, these elements should not be limited by these terms. These terms are only used to distinguish one element from another and not necessarily to assign order or priority. Thus, a first element, component, region, layer or section discussed below could be termed a second element, component, region, layer or section without departing from the teachings of the present disclosure.

Throughout the specification, a "display" may refer to a component that performs a function of visually outputting image data. Also, according to an embodiment, when a display panel and a touch pad included in the display have a layer structure and are configured as a touch screen, the display may be used as an input device in addition to an output device. The display may include at least one of a liquid crystal display (LCD), a thin film transistor-LCD (TFT-LCD), an organic light-emitting diode (OLED) display, a flexible display, a three-dimensional (3D) display, an electrophoretic display, a plasma display panel (PDP), and a quantum dot light-emitting diode (QLED).

A "display device" is one of output devices including the above-mentioned displays, and is a device capable of visually displaying image data. The display device may be connected to a desktop computer, a laptop computer, a tablet personal computer (PC), a camera, a mobile phone, a storage medium, and other electronic devices to receive image data wirelessly or by wire. According to an example embodiment, the display device may receive an analog broadcasting signal or a digital broadcasting signal. The display device may be implemented not only as a flat display device but also as a curved display device which has a curved screen or a flexible display device with adjustable curvature. In addition, the display device may be a PC monitor, a TV set, a commercial large format display (LFD), or the like. Also, depending on the implementation of the display device, the display device may include two or more displays.

A portion of a display of the display device where actual content is output may be referred to as a "screen."

Throughout the specification, the term "user" refers to a person who controls functions or operations of a display device, and may include an administrator or an installer.

The terminologies used herein are for the purpose of describing particular example embodiments only and are not intended to be limiting of the present disclosure. As used herein, the singular forms "a", "an", and "the" are intended to include the plural forms as well, and vice versa, unless the context clearly indicates otherwise. It will be further understood that the terms "comprises" and/or "comprising" when used in claims, specify the presence of stated features, integers, steps, operations, elements, and/or components, but do not preclude the presence or addition of one or more other features, integers, steps, operations, elements, components, and/or groups thereof.

FIG. 1 is a view of a display device 100 and a control device 200 according to an example embodiment.

The display device 100 shown in FIG. 1 is a device capable of displaying content different from existing content when the existing content is pivoted while being displayed. The pivoting of the display device 100 means that the display device 100 is changed from a horizontally elongated rectangular shape (i.e., landscape orientation) to a vertically elongated rectangular shape (i.e., portrait orientation) and vice versa.

For example, when the display device 100 has a landscape orientation (hereinafter, referred to as a "landscape mode"), the display device 100 may display landscape-oriented content based on a broadcast signal.

Furthermore, when the display device 100 has a portrait orientation (hereinafter, referred to as a "portrait mode"), the display device 100 may display additional content together with landscape-oriented content or may display content based on a source different from a source of the landscape-oriented content.

Here, the source may mean a source of content displayed on the display device 100. A source of video content may be a broadcast signal, a set-top box, a digital streaming device, a digital versatile disc (DVD) player, a Blu-ray disc player, a satellite dish, etc.

The content displayed on the display device 100 in a portrait mode may be content based on various sources. For example, the various sources may include broadcast signals, wired or wireless communication, short-range communication, programs (applications) stored in the display device 100, data stored in the display device 100, and the like.

In addition, the content displayed on the display device 100 in a portrait mode may be content based on a source selected by the user.

Furthermore, the content displayed on the display device 100 in a portrait mode may be personalized content.

The personalized content may be content that is different from content displayed on the display device 100 in a landscape mode based on a broadcast signal. In addition, the personalized content may be content that is displayed differently depending on a user of the display device 100.

For example, the personalized content may include at least one of content predetermined for the user to display in a portrait mode, information related to content the user watched in a landscape mode, and content selected based on the user's mobile device.

The display device 100 may include a device for pivoting a display. For example, the device for pivoting the display may include a hinge or a rotating plate included in a stand-type or wall-type supporting member for supporting the display device 100. In addition, the device for pivoting the display may further include a motor.

The display device 100 may sense that the display device 100 is pivoted while operating in a landscape mode. The display device 100 may sense that the display device 100 is pivoted while operating in a portrait mode.

For example, the display device 100 may be pivoted by an input from the control device 200, one or more input devices provided on the display device 100, or an input or a user's manual operation corresponding to a user interface displayed on the display. The display device 100 may be automatically pivoted by a motor built in the display device 100 based on the input or by a predetermined reference.

The control device 200 may include various devices capable of transmitting and receiving data and signals to/from the display device 100. For example, the control device 200 may be implemented in various forms such as a mobile phone, a smart phone, a remote control, a tablet PC, and a wearable device.

The control device 200 may transmit to the display device 100 an input (e.g., instruction, command, etc.) for changing or selecting content displayed on the display device 100 or an input for changing a source of the content.

Figure 2:
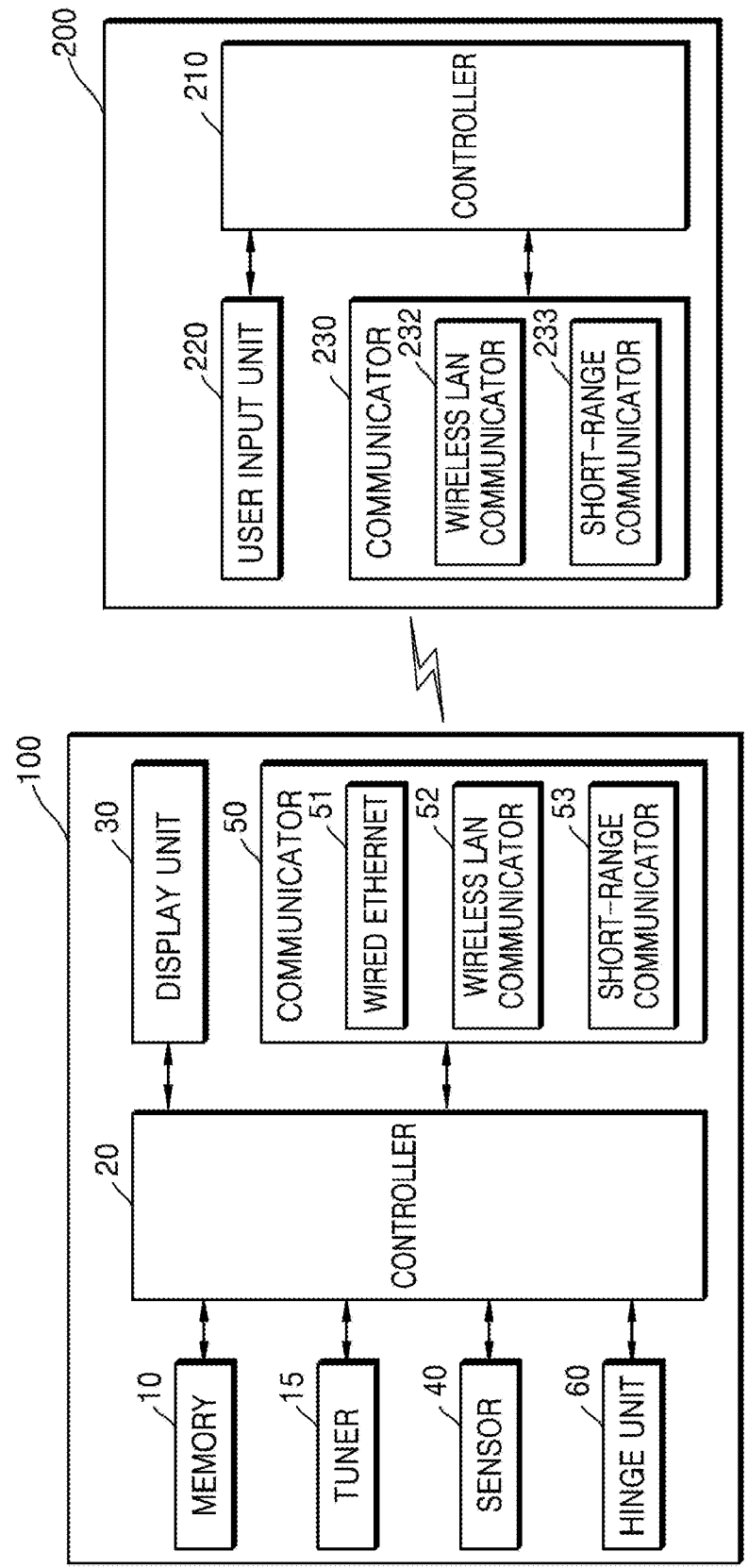
FIG. 2 is a block diagram of a display device and a control device according to an example embodiment.

FIG. 2 is a block diagram of the display device 100 and the control device 200 according to an example embodiment.

Referring to FIG. 2, the display device 100 includes a memory 10, a tuner 15, a controller 20, a display unit 30, a sensor 40, a communicator 50, and a hinge unit 60.

The display device 100 may be a device that can be changed from a horizontally elongated rectangular shape to a vertically elongated rectangular shape and vice versa. In more detail, the display device 100 may be pivoted such that a screen of the display unit 30 is rotated by 90 degrees.

The memory 10 according to an example embodiment may store various data, programs, or applications for driving and controlling the display device 100. A program stored in the memory 10 may include one or more instructions. The program (one or more instructions) or an application stored in the memory 10 may be executed by the controller 20.

For example, the memory 10 may store one or more programs or applications for displaying personalized content according to a user.

The memory 10 may store a control program that is executed by the controller 20 for controlling the display device 100, a presentation module for configuring a display screen, and an application initially provided from a manufacturer or downloaded from the outside. In more detail, the memory 10 may store resources such as a Java Script file and an Extensible Markup Language (XML) file used in the application.

The memory 10 may include a presentation module. The presentation module is a module for configuring a display screen. The presentation module includes a multimedia module for reproducing and outputting multimedia content, a user interface (UI), and a UI rendering module for performing graphics processing. The multimedia module may include a player module, a camcorder module, a sound processing module, and the like. Accordingly, the multimedia module may reproduce various types of multimedia content to generate and play images and sound. The UI rendering module may include an image synthesizer that synthesizes images, a coordinate combination generating module that generates combinations of coordinates on a screen to display images, an X11 module that receives various events from hardware, and a two-dimensional (2D)/three-dimensional (3D) UI toolkit that provides a tool for performing a UI in 2D or 3D form. The various modules and components described herein may be implemented with software (e.g., program instructions), hardware (e.g., processor or circuit), or a combination of both.

The memory 10 may also store a graphical user interface (GUI) associated with an application, objects (e.g., images, texts, icons, buttons, etc.) for providing the GUI, user information, documents, databases, or related data.

In an example embodiment, the memory 10 may be a read-only memory (ROM) for storing a control program for controlling the display device 100, a random access memory (RAM) for storing signals or data input from the outside, which is used as a storage area corresponding to various operations performed on the display device 100, or a memory card (e.g., a micro secure digital (SD) card or a Universal Serial Bus (USB) memory, not shown) installed in the display device 100. In addition, the memory 10 may include a nonvolatile memory, a volatile memory, a flash memory, a hard disk drive (HDD), or a solid-state drive (SSD).

The memory 10 may include a volume control module, a communication control module, a voice recognition module, a motion recognition module, a light receiving module, a display control module, an audio control module, an external input control module, a power control module, a power control module of an external device connected to the memory 10 wirelessly (for example, Bluetooth), a voice database (DB), or a motion DB. The modules and databases in the memory 10 may be implemented in the display device 100 in a software form to perform a volume control function, a communication control function, a voice recognition function, a motion recognition function, a light reception control function, an audio control function, an external input control function, a power control function, or a display control function for controlling a display of a cursor. The controller 20 may perform respective functions using the pieces of software stored in the memory 10.

The tuner 15 may receive a broadcast signal from a source such as an analog broadcast or a digital broadcast. The tuner 15 may be integrated with the display device 100 or may be implemented as a separate device (for example, a set-top box (not shown)) having a tuner electrically connected to the display device 100).

The tuner 15 may select only a frequency of a channel to be transmitted to the display device 100 from among many electric wave components by tuning the same through amplification, mixing, resonance, etc. of a broadcast signal received through wire or wirelessly. The broadcast signal includes audio, video and additional information (for example, an electronic program guide (EPG)).

The tuner 15 may receive a broadcast signal in a frequency band corresponding to a channel number (e.g., Ch. 506 of cable broadcasting) according to a user's input (e.g., an input of a control signal from the control device 200 such as a channel number input, an up-down input of channels, and a channel input from an EPG display).

The tuner 15 may receive broadcast signals from various sources such as terrestrial broadcast, cable broadcast, satellite broadcast, Internet broadcast, and the like. The tuner 15 may also receive a broadcast signal from a source such as an analog broadcast or a digital broadcast. A broadcast signal received through the tuner 15 is decoded (e.g., audio decoding, video decoding, or additional information decoding) and separated into audio, video and/or additional information. The separated audio, video and/or additional information may be stored in the storage 190 under the control of the controller 20.

The tuner 15 of the display device 100 may be one or more. According to an example embodiment, when a plurality of tuners 15 are provided, a plurality of broadcast signals may be output to a plurality of windows constituting a multi-window screen provided on the display unit 30.

The controller 20 according to an example embodiment may execute one or more programs stored in the memory 10. The controller 20 may include a processor including a single core, a dual core, a triple core, a quad core, and multiples thereof. In addition, the controller 20 may include a plurality of processors.

The controller 20 may control to display video content based on a first source.

The controller 20 may sense pivoting of the display device 100. According to an example embodiment, the controller 20 may sense the pivoting of the display device 100 based on an input from a user interface, sensing through a gyro sensor or an acceleration sensor of the sensor 40, and/or an input from the control device 200 received via the communicator 50.

In addition, the controller 20 may sense the pivoting of the display device 100 while the video content is displayed, and in response to the pivoting, may control personalized content different from the video content based on at least one second source different from the first source such that the personalized content is displayed.

The first source according to an example embodiment may include a broadcast signal. The broadcast signal may include a broadcast stream signal based on a terrestrial wave or a phase wave through a tuner. In addition, the broadcast signal may include a wireless stream signal based on an over-the-top (OTT) service.

The at least one second source according to an example embodiment may include a first source and a wired or wireless communication signal of a display device.

The controller 20 may obtain information related to video content based on the second source.

The controller 20 may display the video content on a portion of a screen of a display and display the information related to the video content on the remaining area of the screen of the display.

The controller 20 may display the same personalized content as the content displayed on a screen of a user's mobile device.

The controller 20 may display personalized content including still images stored in advance on a display device or a user's mobile device.

The controller 20 may display personalized content including a user interface for controlling a peripheral device capable of communicating with a display device.

The controller 20 controls all operations of the display device 100 and a signal flow between the internal components 10 to 50 of the display device 100 and performs data processing. The controller 20 may execute an operating system (OS) and various applications stored in the memory 10 when the controller 20 receives an input of a user or satisfies predetermined conditions.

The controller 20 may include a processor such as a central processing unit (CPU). The controller 20 may include a graphics processing unit (GPU) for graphics processing corresponding to a video. The controller 20 may be implemented as a system on chip (SoC) integrating a core and the GPU.

The display unit 30 displays a video included in a broadcast signal received through the tuner 15 on a screen under the control of the controller 20. In addition, the display unit 30 may display content (e.g., a video) input through the communicator 50 under the control of the controller 20. The display unit 30 may output an image stored in the memory 10 under the control of the controller 20.

The sensor 40 may further include a gyro sensor or an acceleration sensor. According to an example embodiment, the sensor 40 may sense the pivoting of the display device 100 using a gyro sensor or an acceleration sensor.

In addition, the sensor 40 may include a microphone or an optical sensor, so that the sensor 40 may sense a user's voice and user's interaction.

The communicator 50 may transmit and receive data and signals to/from the control device 200 or an external device under the control of the controller 20. The controller 20 may transmit and receive content to/from the control device 200 connected through the communicator 150 or the external device, may download an application from the external device, or may browse the Internet.

The communicator 50 may include at least one of a wired Ethernet 51, a wireless LAN communicator 52, and a short-range communicator 53.

The wireless LAN communicator 52 may perform Wi-Fi communication or Wi-Fi direct communication with the control device 200 or the external device.

The short-range communicator 53 may further perform Bluetooth communication, Bluetooth low energy (BLE) communication, Infrared Data Association (IrDA) communication, ultra wideband (UWB) communication, magnetic security transmission (MST), near field communication (NFC), or the like.

The communicator 50 according to an example embodiment may obtain current weather information and current time information. The communicator 50 may obtain the current weather information and the current time information through the control device 200.

The communicator 50 may receive data on a screen displayed on the control device 200 or the external device.

The hinge unit 60 may be configured to pivot a display. For example, the hinge unit 60 may include a hinge or rotating plate included in a stand-type or wall-type supporting member for supporting the display device 100. Furthermore, the hinge unit 60 may further include a motor.

The display device 100 may be electrically connected to a separate external device (e.g., a set-top box, not shown) having a tuner. For example, the display device 100 may be implemented as an analog TV, a digital TV, a 3D TV, a smart TV, an LED TV, an OLED TV, a plasma TV, a monitor, or the like, but is not limited thereto.

Referring to FIG. 2, the control device 200 may include a controller 210, a user input unit 220, and a communicator 230.

The control device 200 may be a device capable of transmitting and receiving data to/from the display device 100 through the communicator 230.

For example, the control device 200 may be implemented as a mobile phone, a smart phone, a remote control, a video player, a tablet PC, a camera, and a wearable device that can be worn (attached or implanted) to the body.

The controller 210 controls all matters related to control of the control device 200. The controller 210 may include a processor such as a CPU, a GPU, or an SoC.

The user input unit 220 may include a keypad, a button, a touchpad, and/or a touch screen. A user may operate the user input unit 220 to input instructions related to the display device 100 to the control device 200. When the user input unit 220 has a physical key button, the user may input instructions related to the display device 100 to the control device 200 through a push operation of the physical key button. When the user input unit 220 has a touch screen, the user may touch a soft key of the touch screen to input instructions related to the display device 100 to the control device 200.

According to an example embodiment, the user input unit 220 may receive a user's input for controlling the pivoting of the display device 100 through the physical key or the soft key of the touch screen.

The user input unit 220 may receive a user's input for changing a current channel to another channel displayed in a predetermined channel list.

In addition, the user input unit 220 may receive an input for changing a source of personalized content. For example, the user input unit 220 may receive input to change the source of the personalized content from a broadcast signal to a user's mobile device (e.g., a tablet PC or a smartphone).

The user input unit 220 may include various types of input units such as a scroll key, a jog key, and the like that can be operated by a user. In addition, the user input unit 220 may include at least one of a microphone capable of receiving a user's voice and a sensor capable of motion recognition of the control device 200.

The communicator 230 may be a communication interface (e.g., transceiver) configured to transmit and receive signals to/from the display device 100. The communicator 230 may include a wireless LAN communicator 232 and a short-range communicator 233.

The wireless LAN communicator 232 may be configured to perform Wi-Fi communication or Wi-Fi direct communication with the display device 100. The short-range communicator 233 may communicate with the display device 100 via Bluetooth communication, BLE communication, IrDA communication, UWB communication, MST, NFC, or the like.

Figure 3:
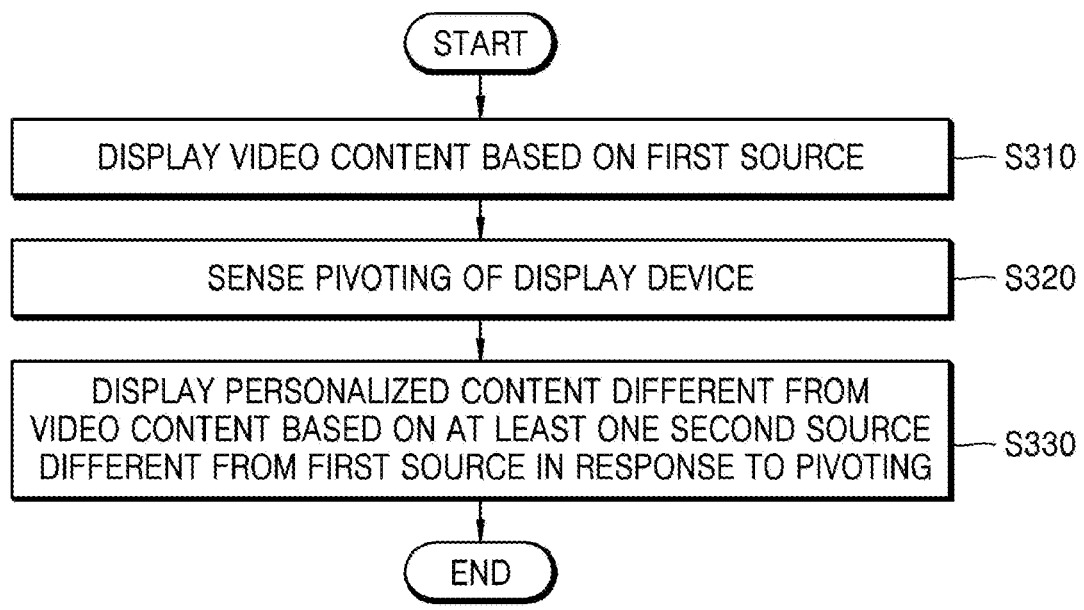
FIG. 3 is a flowchart of a method of displaying content in a display device, according to an example embodiment.

FIG. 3 is a flowchart of a method of displaying content in the display device 100, according to an example embodiment.

In operation S310, the display device 100 may display video content based on a first source. For example, the first source may include a broadcast signal.

In operation S320, the display device 100 may sense pivoting of the display device 100 while the video content is displayed. The pivoting of the display device 100 means that the display device 100 is changed from a horizontally elongated rectangular shape to a vertically elongated rectangular shape and vice versa.

In operation S330, in response to the pivoting, the display device 100 may display personalized content different from the video content based on at least one second source different from the first source.

The at least one second source may include at least one of broadcast signals, wired or wireless communication, short-range communication, programs (applications) stored in the display device 100, data stored in the display device 100, and signals from a user's mobile device.

Figure 4:
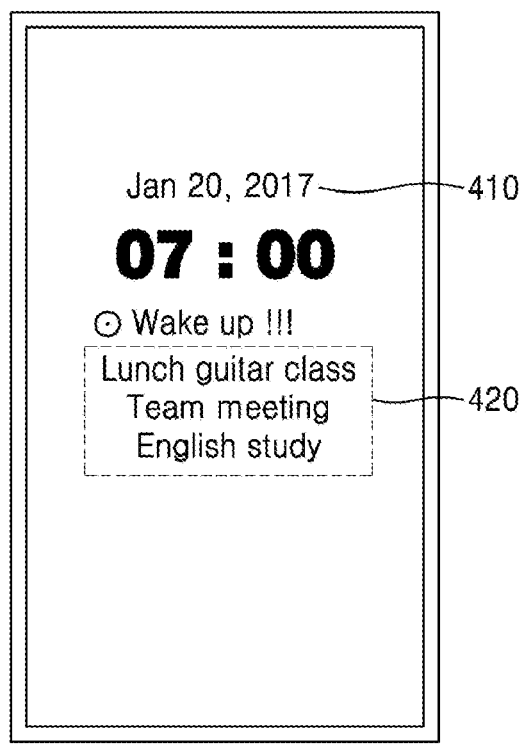
FIG. 4 is a view of a screen displayed on a display device in a portrait mode, according to an example embodiment.

FIG. 4 is a view of a screen displayed on the display device 100 in a portrait mode, according to an example embodiment.

Referring to FIG. 4, the display device 100 may display personalized content in a portrait mode.

According to an example embodiment, the display device 100 may display video content in a landscape mode, and then may display the personalized content in response to a change to a portrait mode.

According to another example embodiment, when the display device 100 is in a portrait mode, the display device 100 may be set to display personalized content at a predetermined time.

For example, the display device 100 may display personalized content including at least one of current time information 410 and user's schedule information 420 when sensing a change to a portrait mode.

The personalized content according to an example embodiment may correspond to an application predetermined (e.g., selected, designated, etc.) by a user or a predetermined function.

Referring to FIG. 4, a user may set an alarm function to be executed at a predetermined time while the predetermined application is executed in the display device 100.

Also, the display device 100 may transmit and receive data to/from an external device via wired/wireless communication (wireless communication may include, for example, Wi-Fi, Bluetooth, or NFC).

For example, the display device 100 may receive information on personalized content including the user's schedule information 420 from a user's mobile device, a server, a user's PC, etc. through wired/wireless communication.

Figure 5:
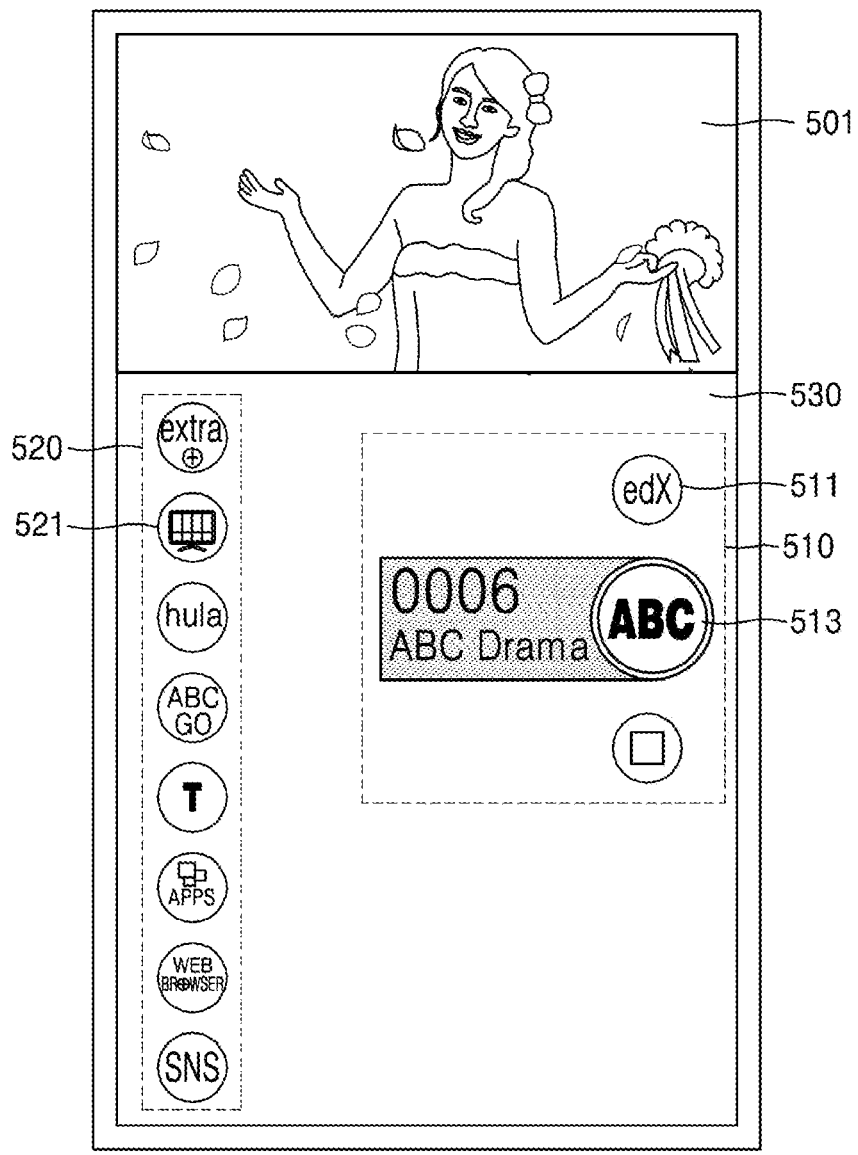
FIG. 5 is a view of a screen displayed on a display device in a portrait mode, according to an example embodiment.

FIG. 5 is a view of a screen displayed on the display device 100 in a portrait mode, according to an example embodiment.

The display device 100 may display video content 501 based on a broadcast stream in a landscape mode.

The video content 501 according to an example embodiment includes terrestrial wave or phase wave broadcasting content through a tuner and OTT content through a wireless stream. In response to pivoting of the display device 100 being sensed, the display device 100 may display personalized content 530 based on a source different from the broadcast stream simultaneously with the video content 501.

Here, the pivoting of the display device 100 may mean that the display device 100 is changed from a landscape mode to a portrait mode while operating.

The display device 100 may display the personalized content 530 based on a source predetermined by a user in response to the sensing of the pivoting of the display device 100.

For example, when the pivoting of the display device 100 is sensed, the display device 100 may display the personalized content 530 based on data pre-stored (e.g., previously stored, preloaded, etc.) in the display device 100, wired or wireless communication with an external device, and the like.

Referring to FIG. 5, the personalized content 530 may include a pre-stored channel list 510.

The pre-stored channel list 510 may include an icon 511 for a channel, a source, or an application frequently used by a user. Also, the pre-stored channel list 510 may include an icon 513 for a currently used channel, source, or application. The display device 100 may display the icon 513 for a currently used channel, a source, or an application in a form different from other pre-stored icons in the channel list 510.

In addition, the personalized content 530 may include a menu list 520 related to the video content 501. The menu list 520 may include an icon 521 for an application having a high probability (e.g., probability above a predetermined threshold) of being selected by a user while playing the video content 501. In addition, the menu list 520 may be an icon for an application predetermined by a user (e.g., favorited or pinned icon).

Figure 6:
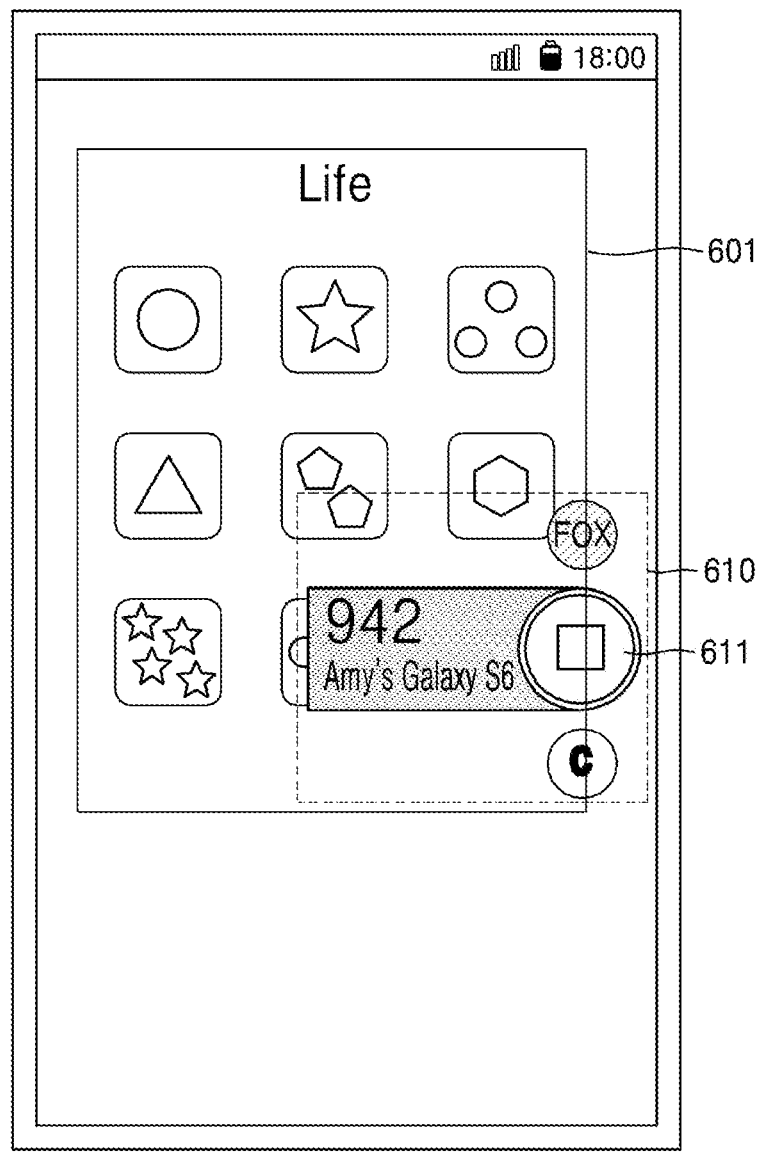
FIG. 6 is a view of a screen displayed on a display device in a portrait mode, according to an example embodiment.

FIG. 6 is a view of a screen displayed on the display device 100 in a portrait mode, according to an example embodiment.

The display device 100 may display personalized content 601 in response to sensing of pivoting of the display device 100.

For example, in response to the pivoting of the display device 100 being sensed, the display device 100 may search for a mobile device around the display device 100 and may be wirelessly connected to the searched mobile device 100.

The display device 100 may receive at least one of a source of the personalized content 601 to be displayed in a portrait mode, the personalized content 601, and a screen to be displayed in a portrait mode from the wirelessly-connected mobile device. The source of the personalized content 601 to be displayed in a portrait mode and the personalized content 601 may be preloaded in the display device 100.

Referring to FIG. 6, in response to the sensing of the pivoting of the display device 100, the display device 100 may display a screen received from the wirelessly-connected mobile device.

The display device 100 may display a pre-stored (e.g., preloaded) channel list 610 together with the screen received from the wirelessly connected mobile device.

Referring to FIG. 6, the pre-stored channel list 610 may include an icon 611 for a mobile device.

Referring to FIG. 6, a currently used source may be a user's mobile device (e.g., "Amy's Galaxy S6" smartphone). The display device 100 may mirror a mobile device's screen based on an input for selecting the icon 611 for the mobile device in the pre-stored channel list 610.

A user may easily access channels, sources, and applications frequently used by the user by selecting one of icons in the pre-stored channel list 610.

Figure 7A:
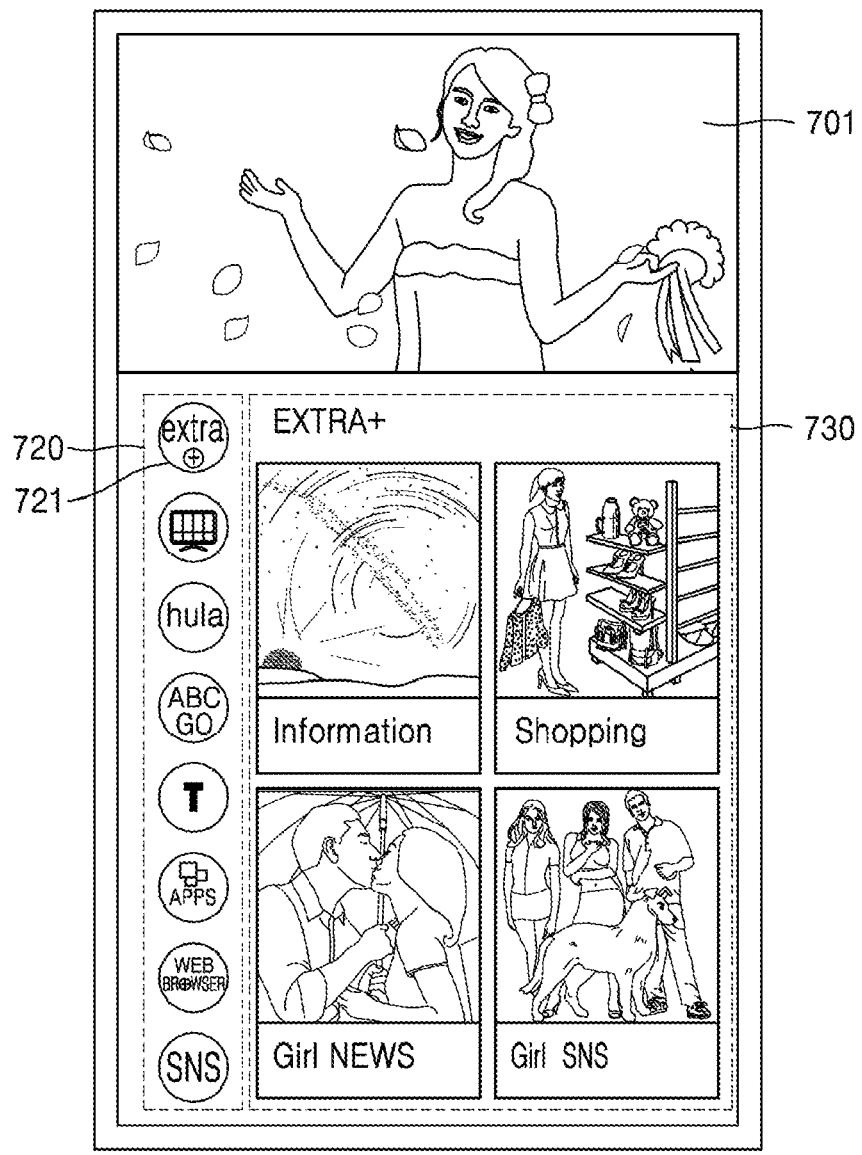
FIG. 7A is a view of a screen including content-related information displayed on a display device in a portrait mode, according to an example embodiment.

FIG. 7A is a view of a screen including content-related information displayed on the display device 100 in a portrait mode, according to an example embodiment.

In response to pivoting of the display device 100 being sensed, the display device 100 may display personalized content based on a source different from a source of video content 701 simultaneously with the video content 701.

The display device 100 may display the video content 701 on a portion of the screen. For example, the display device 100 may display the video content 701 at the top, bottom or center of the display. In addition, the display device 100 may display personalized content in the remaining area of the screen other than the video content 701.

Referring to FIG. 7A, the personalized content may include a menu list 720 and content-related information 730 related to the video content 701.

The display device 100 may display the content-related information 730 based on an icon 721 being selected in the menu list 720.

For example, the content-related information 730 may include an item related to information that a user is likely to want to know with respect to the video content 701 being watched by the user. For example, the content-related information 730 may include additional information on a movie or a TV show, news, a social network service (SNS), shopping information on articles of clothing worn by characters on TV, and the like. The content-related information 730 may be based on various sources such as the Internet, a provider of the video content 701, a broadcast stream, and the like.

A user may easily obtain information on the video content 701 without inputting a keyword through the content-related information 730.

On the other hand, the display device 100 may receive a user's voice input through a microphone mounted on the control device 200 or a microphone built in the display device 100. The display device 100 may display the content-related information 730 that meets user's intent based on the user's voice input.

Figure 7B:
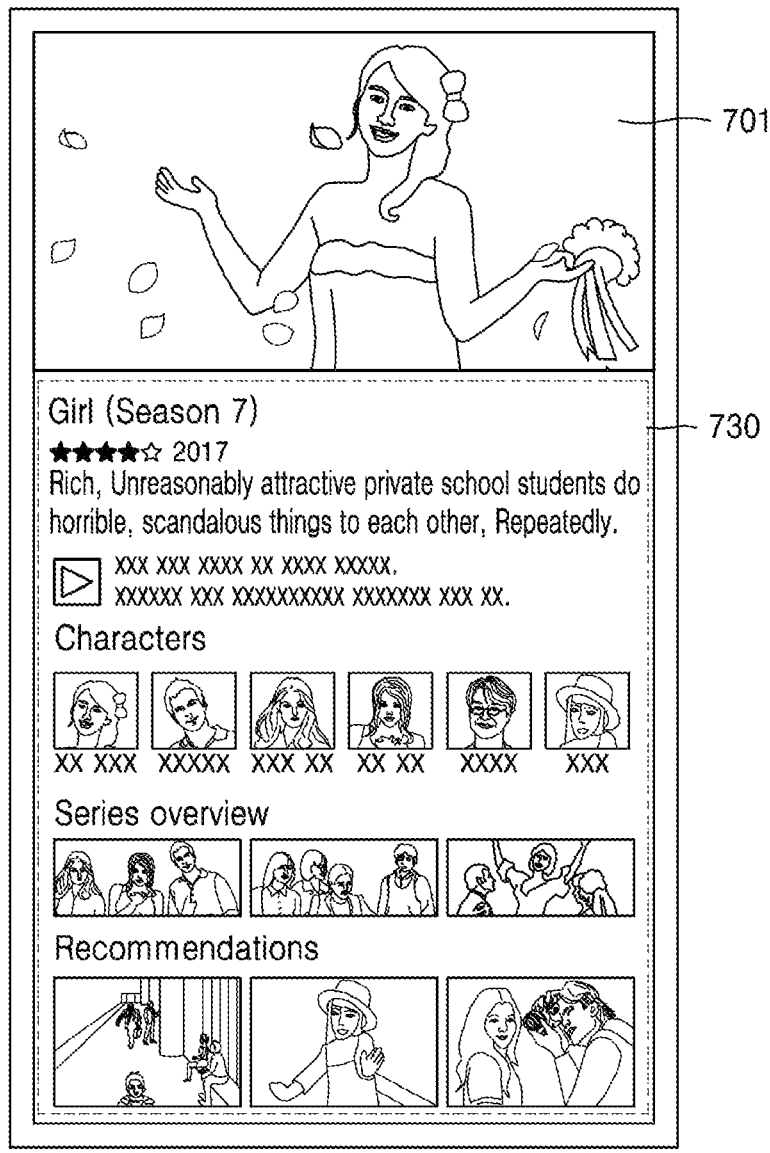
FIG. 7B is a view of a screen including content-related information displayed on a display device in a portrait mode, according to an example embodiment.

FIG. 7B is a view of a screen including content-related information displayed on the display device 100 in a portrait mode, according to an example embodiment.

In response to pivoting of the display device 100 being sensed, the display device 100 may simultaneously display the video content 701 and the content-related information 730. The display device 100 according to an example embodiment may provide the content-related information 730 using a portion of the top or bottom of the screen in a portrait mode.

For example, when the video content 701 is a movie or a TV show, the content-related information 730 may be related to a story or a character of the movie or the show. If the video content 701 is a lecture, the content-related information 730 may include additional information on the content described in the lecture.

The display device 100 may be able to present the content-related information 730 in a portrait mode more effectively than the content-related information 730 in a landscape mode.

Figure 7C:
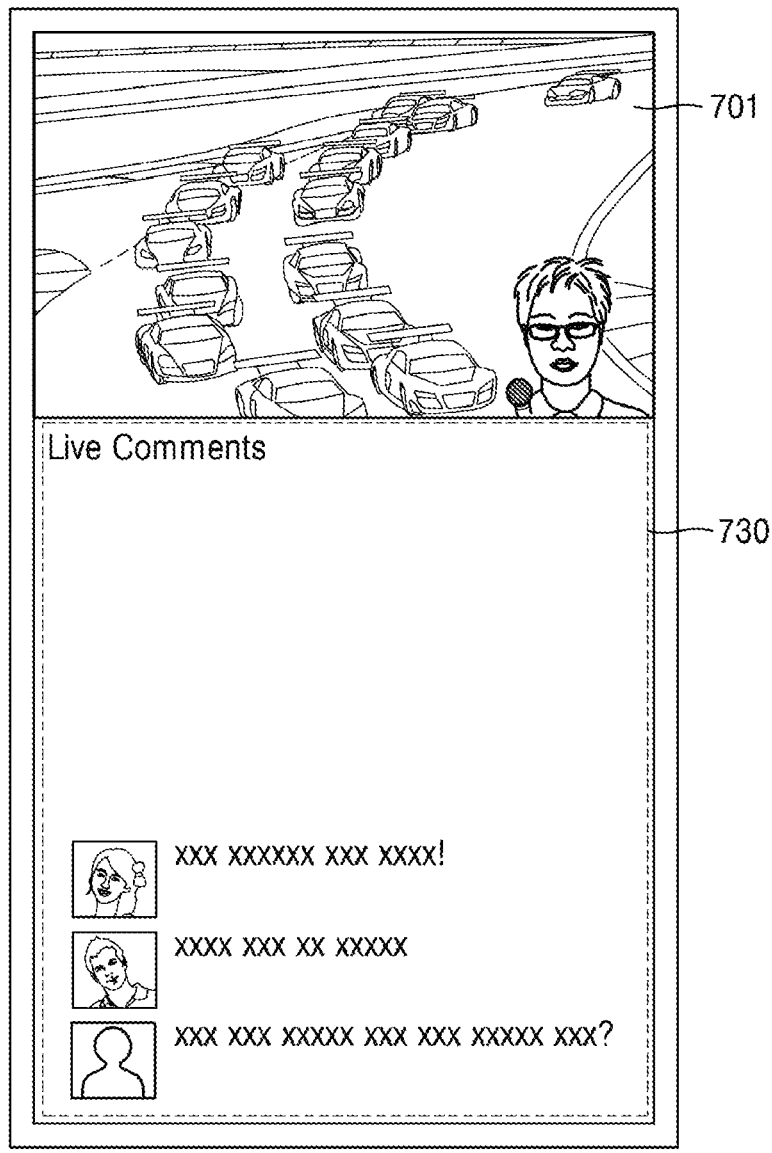
FIG. 7C is a view of a screen including content-related information displayed on a display device in a portrait mode, according to an example embodiment.

FIG. 7C is a view of a screen including the content-related information 730 displayed on the display device 100 in a portrait mode, according to an example embodiment.

The display device 100 may simultaneously display the video content 701 and the content-related information 730.

Referring to FIG. 7C, the content-related information 730 may be a real-time comment of viewers watching the video content 701.

According to an example embodiment, the display device 100 may receive a user's input to provide a real-time comment.

For example, the display device 100 may activate a function of receiving an input from a user's mobile device in response to receiving an input of pushing a predetermined button on the control device 200. The display device 100 may receive a user's input via a touch screen of the mobile device.

As another example, the display device 100 may receive a user's voice input through the control device 200 or the user's mobile device.

FIG. 8 is a flowchart of a method of displaying content in the display device 100, according to an example embodiment.

In operation S810, the display device 100 may display video content based on a first source.

In operation S820, the display device 100 may sense pivoting of the display device 100 in a first direction. The pivoting of the display device 100 in the first direction means that the display device 100 is changed from a horizontally elongated rectangular shape to a vertically elongated rectangular shape. Alternatively, the direction change may be from the vertically elongated rectangular shape (i.e., portrait mode) to the horizontally elongated rectangular shape (i.e., landscape mode).

In operation S830, in response to the pivoting, the display device 100 may display personalized content based on at least one second source different from the first source. The personalized content may be different from the video content based on the first source.

In operation S840, the display device 100 may sense pivoting of the display device 100 in a second direction.

The pivoting of the display device 100 in the second direction means that the display device 100 is changed in the opposite direction of the first direction. For example, the second direction may correspond to moving from a vertically elongated rectangular shape to a horizontally elongated rectangular shape.

In operation S850, in response to the pivoting, the display device 100 may display the video content based on the first source.

For example, when the display device 100 senses the pivoting in the second direction while simultaneously displaying the video content and the personalized content, the display device 100 may display only the video content from the first source without displaying the personalized content from the second source.

Figure 9:
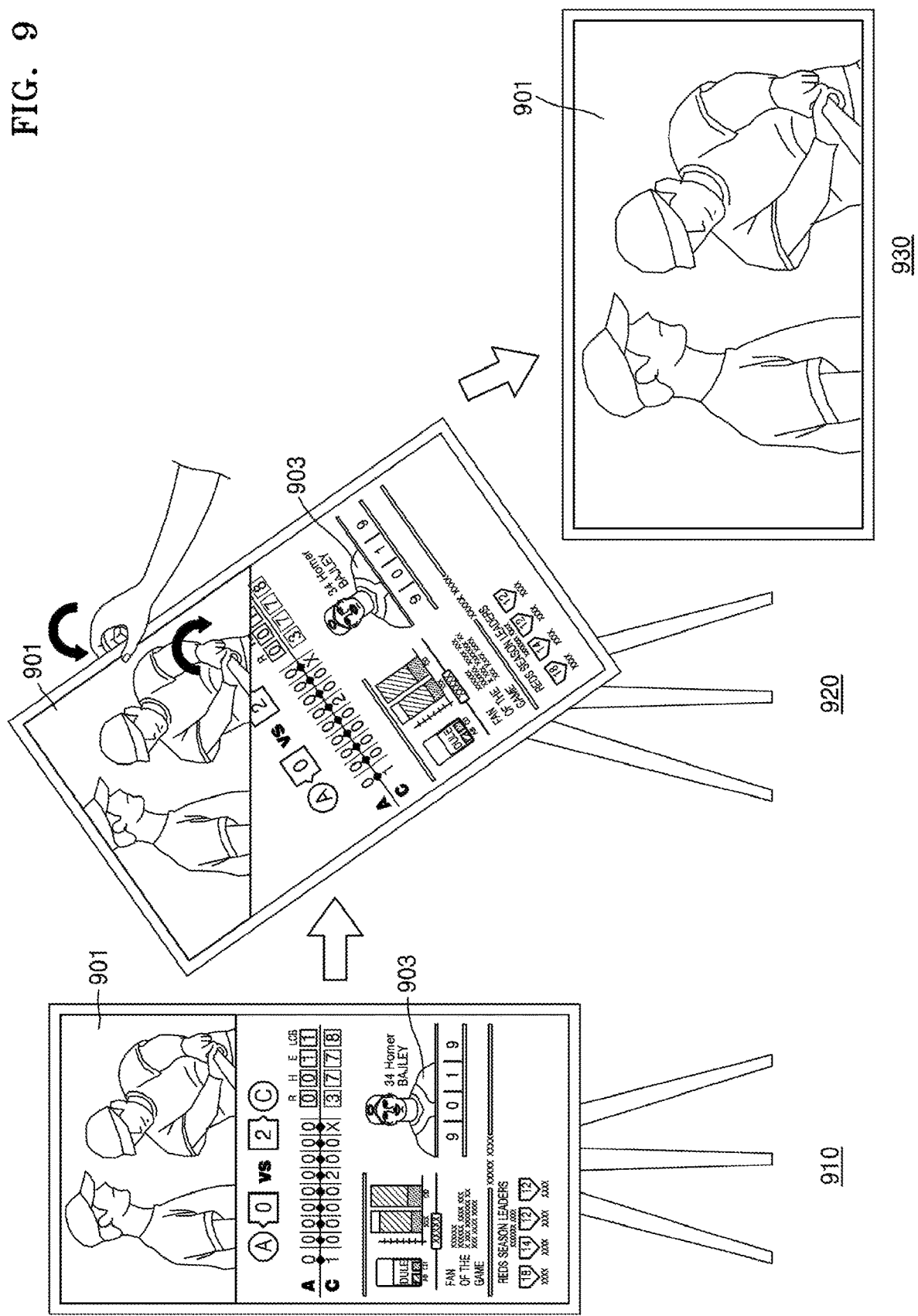
FIG. 9 is a view of a screen displayed on a display device according to an example embodiment when the display device is switched from a portrait mode to a landscape mode.

FIG. 9 is a view of a screen displayed on the display device 100 according to an example embodiment when the display device 100 is switched from a portrait mode to a landscape mode.

In 910 of FIG. 9, the display device 100 may simultaneously display video content 901 and content-related information 903. When the video content 901 is, for example, a sports game, the content-related information 903 may include game progress information, player information, and the like.

In 920 of FIG. 9, the display device 100 may sense pivoting of the display device 100. For example, in 920, the pivoting of the display device 100 means that the display device 100 is changed from a vertically elongated rectangular shape to a horizontally elongated rectangular shape.

Referring to 920 of FIG. 9, the video content 901 may be rotated in a screen of the display device 100 in a direction opposite of the pivoting direction of the display device 100. In addition, the content-related information 903 may be displayed in the screen of the display device 100 without rotating.

In 930 of FIG. 9, the display device 100 changed to a landscape mode may display only the video content 901.

Figure 10:
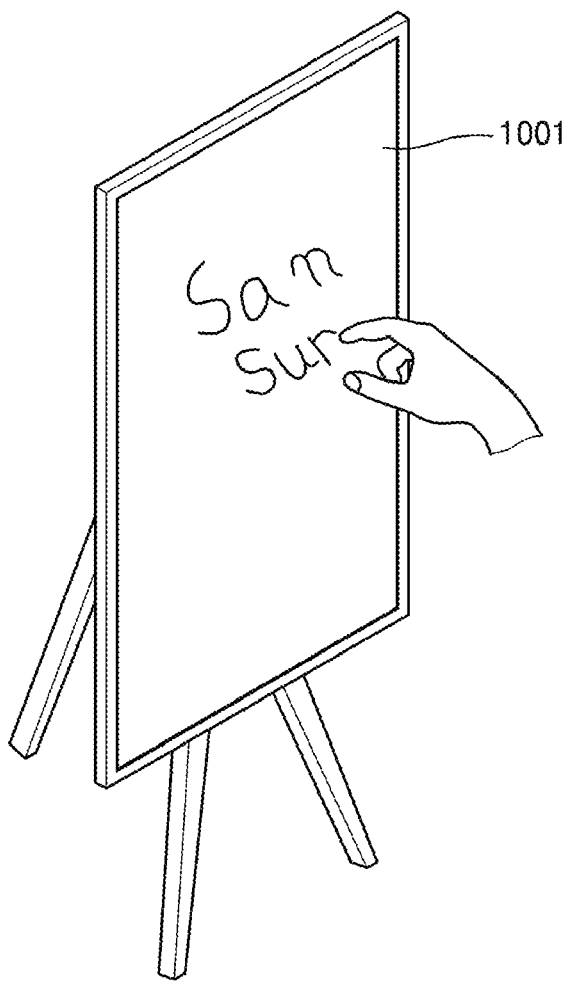
FIG. 10 is a view of a screen displayed on a display device in a portrait mode, according to an example embodiment.

FIG. 10 is a view of a screen displayed on the display device 100 in a portrait mode, according to an example embodiment.

When a display of the display device 100 is capable of receiving a touch input, the display device 100 may be utilized as a writing board 1001 such that the display device 100 may mimic the behaviors of a writing surface such as a white board.

For example, when the display device 100 is in a portrait mode, the board function may be executed in the display device 100. The display device 100 may display the board 1001 based on a user's touch input.

The display device 100 may receive the user's touch input based on well-known methods of providing touch inputs such as an electrostatic method, an infrared (IR) method, and an ultrasonic method.

Figure 11A:
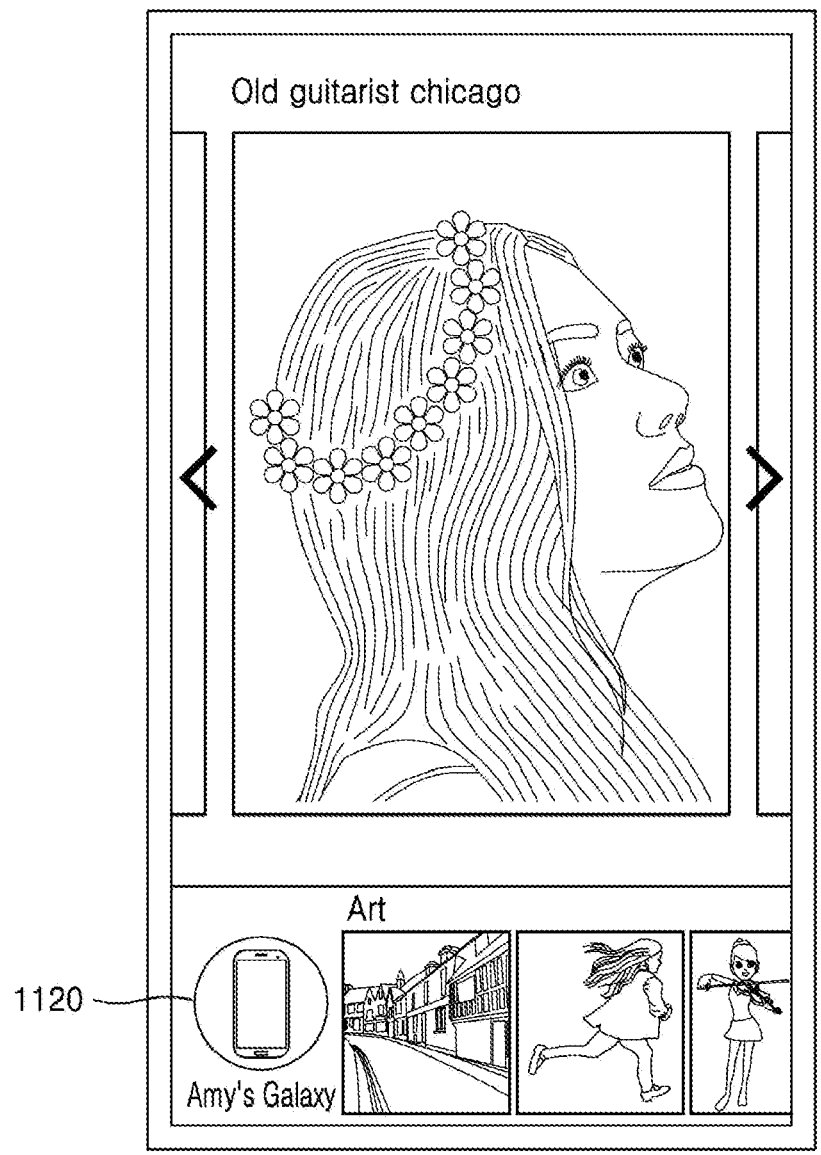
FIG. 11A is a view of a screen displayed on a display device in a portrait mode, according to an example embodiment.

FIG. 11A is a view of a screen displayed on the display device 100 in a portrait mode, according to an example embodiment.

In response to pivoting of the display device 100 being sensed, the display device 100 may search for a mobile device in the vicinity of the display device 100 (e.g., via Bluetooth, Wi-Fi, NFC, etc.).

When a user's mobile device is discovered near the display device 100, the display device 100 may display an image stored in the mobile device together with information 1120 on the searched mobile device.

Figure 11B:
FIG. 11B is a view of a screen displayed on a display device in a portrait mode, according to an example embodiment.

FIG. 11B is a view of a screen displayed on the display device 100 in a portrait mode, according to an example embodiment.

The display device 100 may display a selected image 1101 from among images stored in a mobile device when the display device 100 is in a portrait mode.

Also, the display device 100 may display the selected image 1101 only when it is determined that there is a user in its vicinity (e.g., within a threshold distance from the display device 100). The display device 100 may not display the display selected image 1101 unless a user is sensed in its vicinity. The display device 100 may turn off power of the display device 100 when a user is not sensed in its vicinity.

For example, the display device 100 may sense whether there is a user in its vicinity based on whether or not a mobile device is discovered in its vicinity. Furthermore, the display device 100 may sense whether there is a user in its vicinity based on images obtained by the display device 100 or an external device. The obtained images may include an image based on an ultrasonic wave, an infrared camera, or the like.

Figure 12:
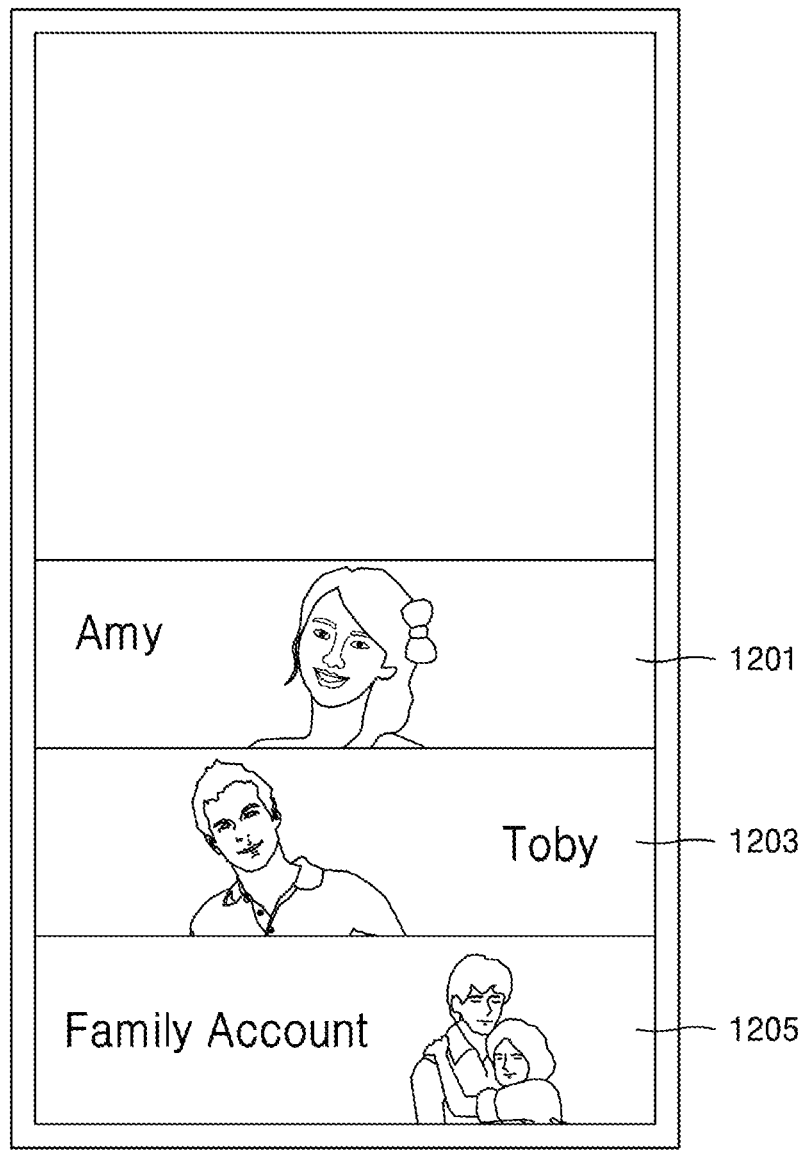
FIG. 12 is a view of a screen displayed on a display device in a portrait mode, according to an example embodiment.

FIG. 12 is a view of a screen displayed on the display device 100 in a portrait mode, according to an example embodiment.

In response to pivoting of the display device 100 being sensed, the display device 100 may search for a mobile device around the display device 100.

For example, when a plurality of mobile devices are discovered, the display device 100 may display user accounts 1201 and 1203 of users corresponding to the plurality of mobile devices. In addition, the display device 100 may display all of family members' user accounts so that an account of a desired family member may be selected from an account list 1205 of the family members.

Figure 13:
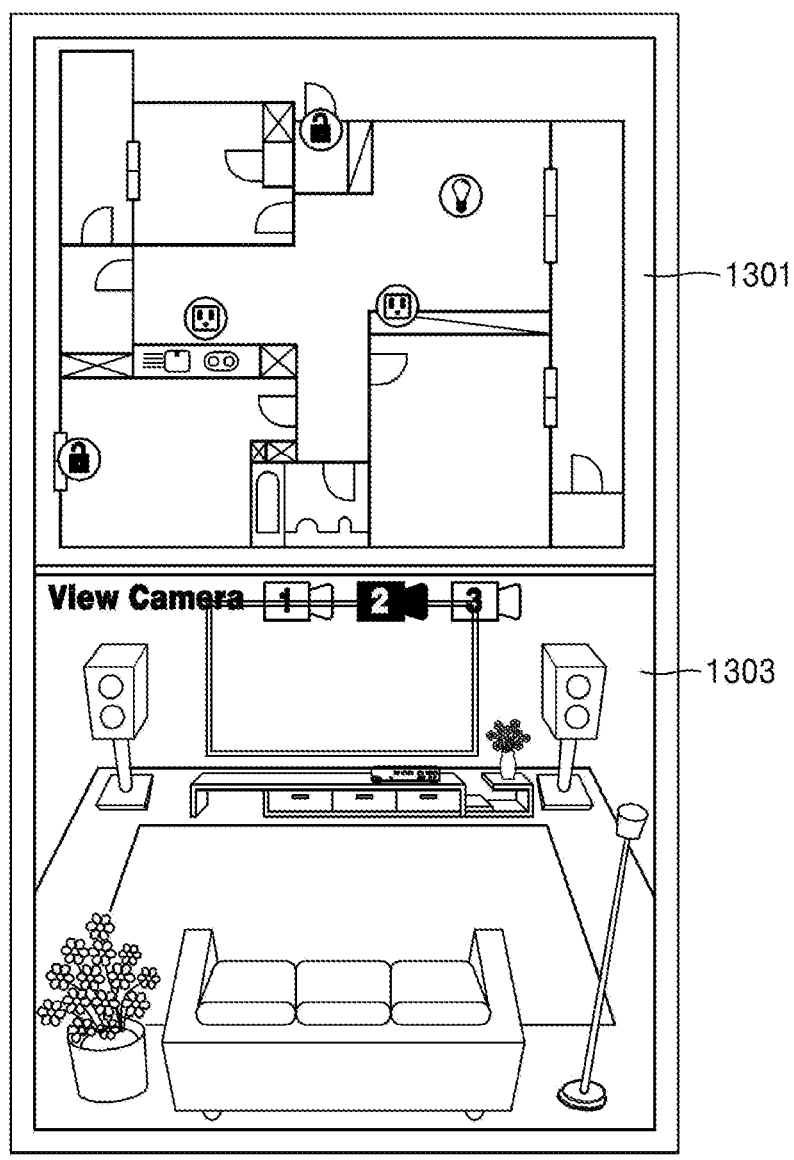
FIG. 13 is a view of a screen displayed on a display device in a portrait mode, according to an example embodiment.

FIG. 13 is a view of a screen displayed on the display device 100 in a portrait mode, according to an example embodiment.

The display device 100 may display a user interface 1301 for monitoring a status of a peripheral device capable of communicating with the display device 100.

For example, the user interface 1301 may indicate a position and a state of an Internet of Things (IoT) device (e.g., a lamp, a door lock for a door or window, a coffee maker, a thermostat, a surveillance camera, etc.) near where the display device 100 is located.

In addition, the display device 100 may display an inside view 1303 (e.g., real-time surveillance footage) of a room photographed using a camera installed in the room below the user interface 1301.

FIG. 14 is a view of a screen displayed on the display device 100 in a portrait mode, according to an example embodiment.

The display device 100 may display a user interface 1401 for controlling a peripheral device capable of communicating with the display device 100 and a user interface 1403 for monitoring status of the peripheral device.

For example, a user may move an icon 1411 of an IoT device to be controlled from the user interface 1403 to the user interface 1401 through a drag-and-drop input.

When the display device 100 is in a portrait mode at a certain time (e.g., morning), a user may control peripheral devices corresponding to the icons 1411 that are selected and/or pre-arranged at the user interface 1401.

For example, the display device 100 may control the IoT device based on a user input of touching the icon 1411 displayed on the screen. Furthermore, the display device 100 may control the IoT device based on inputs provided to a user's mobile device connected to the display device 100.

A control method according to an example embodiment may be implemented as program instructions which can be executed by a computer or a processor, and recorded on a non-transitory computer-readable medium. The computer-readable medium may include program instructions, data files, data structures or a combination thereof. Program instructions recorded on the medium may be particularly designed and structured for the present disclosure or available to those skilled in computer software. Examples of the computer-readable recording medium include magnetic media, such as a hard disk, a floppy disk, and a magnetic tape; optical media, such as a compact disc read-only memory (CD-ROM) and a digital versatile disc (DVD); magneto-optical media, such as floptical discs; a ROM; a RAM; and a flash memory. Program instructions may include, for example, high-level language code that can be executed by a computer using an interpreter, as well as machine language code generated by a complier.

It should be understood that example embodiments described herein should be considered in a descriptive sense only and not for purposes of limitation. Descriptions of features or aspects within each example embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A display device comprising:
    a display; and
    a controller configured to:
        control the display to display first video content provided by a first external source,
        sense pivoting of the display while the first video content is displayed, and
        control the display, based on the pivoting of the display being sensed, to display second video content provided by at least one second external source different from the first external source, the second video content being different from the first video content,
    wherein the second video content includes content-related information of the first video content provided by the at least one second external source, and
    wherein the controller is further configured to control the display, based on the pivoting of the display being sensed, to display the first video content provided by the first external source on a first portion of a screen of the display and the content-related information of the first video content provided by the at least one second external source on a second portion of the screen of the display.

2. The display device of claim 1, wherein the second video content comprises personalized content for a user of the display device.

3. The display device of claim 1, wherein the at least one second external source comprises a source selected by a user of the display device.

4. The display device of claim 1, wherein the first external source comprises a broadcast signal, and
    wherein the at least one second external source comprises a wired or wireless communication signal of the display device.

5. The display device of claim 2, wherein the controller is further configured to obtain information related to the second video content, and
    wherein the personalized content comprises the content-related information of the first video content.

6. The display device of claim 2, wherein the personalized content comprises at least one of a preloaded channel list and a menu list related to the first video content.

7. The display device of claim 2, wherein the at least one second external source comprises a signal from a mobile device, and
    wherein the personalized content is identical to third video content being displayed on a screen of the mobile device.

8. The display device of claim 2, wherein the personalized content comprises at least one of a still image stored in the display device and a mobile device.

9. The display device of claim 2, wherein the personalized content comprises a user interface configured to control a peripheral device capable of communicating with the display device.

10. A method of displaying content on a display device, the method comprising:
    displaying first video content provided by a first external source;
    sensing pivoting of the display device while the first video content is displayed; and
    based on the pivoting of the display device being sensed, displaying second video content provided by at least one second external source different from the first external source, the second video content being different from the first video content,
    wherein the second video content includes content-related information of the first video content provided by the at least one second external source, and
    wherein the displaying of the second video content comprises, based on the pivoting of the display device being sensed, displaying the first video content provided by the first external source on a first portion of a screen of the display device and the content-related information of the first video content provided by the at least one second external source on a second portion of the screen of the display device.

11. The method of claim 10, wherein the second video content comprises personalized content for a user of the display device.

12. The method of claim 10, wherein the at least one second external source comprises a source selected by a user of the display device.

13. The method of claim 10, wherein the first external source comprises a broadcast signal, and
    wherein the at least one second external source comprises one of a wired and wireless communication signal of the display device.

14. The method of claim 11, wherein the displaying of the second video content comprises obtaining information related to the first video content based on the at least one second external source, and wherein the personalized content comprises the content-related information of the first video content.

15. The method of claim 11, wherein the personalized content comprises at least one of a preloaded channel list and a menu list related to the first video content.

16. The method of claim 11, wherein the at least one second external source comprises a signal from a mobile device, and
wherein the personalized content is identical to third video content being displayed on a screen of the mobile device.

17. The method of claim 11, wherein the personalized content comprises at least one of a still image stored in the display device and a mobile device.

18. A non-transitory computer-readable recording medium having recorded thereon a program that is executable to perform a method of displaying content on a display device, the method comprising:
  displaying first video content provided by a first external source;
  sensing pivoting of the display device while the first video content is displayed; and
  based on the pivoting of the display device being sensed, displaying second video content provided by at least one second external source different from the first external source, the second video content being different from the first video content,
wherein the second video content includes content-related information of the first video content provided by the at least one second external source, and
wherein the displaying of the second video content comprises, based on the pivoting of the display device being sensed, displaying the first video content provided by the first external source on a first portion of a screen of the display device and the content-related information of the first video content provided by the at least one second external source on a second portion of the screen of the display device.

* * * * *